June 1, 1965 D. P. EDKINS 3,186,165
TURBOFAN ENGINE SPEED SYNCHRONIZING ARRANGEMENT
Filed Nov. 29, 1961
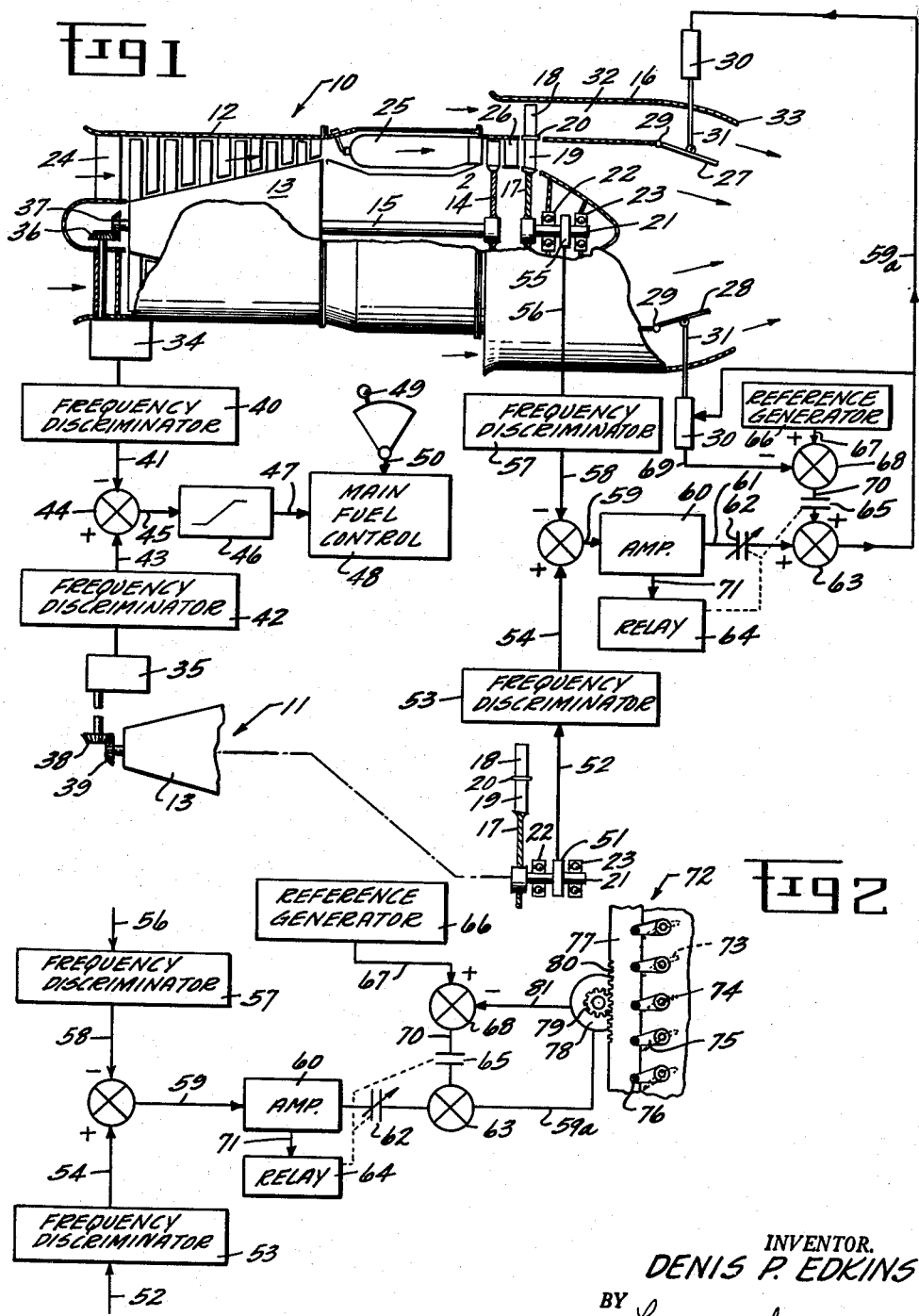
INVENTOR.
DENIS P. EDKINS
BY
Lawrence G. Norris
ATTORNEY ދ
United States Patent Office 3,186,165
Patented June 1, 1965

1

3,186,165
TURBOFAN ENGINE SPEED SYNCHRONIZING ARRANGEMENT
Denis Pierpont Edkins, Lynnfield, Mass., assignor to General Electric Company, a corporation of New York
Filed Nov. 29, 1961, Ser. No. 155,560
2 Claims. (Cl. 60—35.6)

My invention relates to engine synchonizing arrangements and is particularly applicable to turbofan engines having free turbine driven fans.

It is well known that a small mismatch in engine speeds in a multi-engine propeller aircraft causes undesirable beats corresponding to the difference in engine speeds, and a wide variety of engine speed synchronizing arrangements are known to the art for such applications. Such systems generally operate with the speed of one engine, commonly called the master engine, being selected as the speed reference for the system, the speeds of the other engines, usually referred to as slave engines, being controlled to conform to that of the master.

In the case of turbofan engines, however, of the type in which the fan is driven by a free power turbine, there are two separate rotors in each engine and the speed of the fan rotor is normally not controllable except by controlling the speed of the basic engine, that is, the gas generator portion of the engine. Because of manufacturing tolerances and installation differences, speed synchronization of the basic engines in a multiengine installation of free turbine fan engines will, in most cases still leave a significant mismatch in the free turbine fan speeds. A mismatch in the fan speeds will produce a beat frequency excitation generally similar to that produced by a mismatch in propeller speeds in a multi-engine propeller aircraft.

Such a mismatch in fan speeds may be considered acceptable in certain types of installations but is likely to be more critical in configurations where the engines are mounted on the fuselage. because in such installations the engines are closer to each other and also closer to the fuselage such that the effect is more pronounced.

It is, accordingly, an object of my invention to provide an improved synchronizing arrangement for turbofan engines of the free turbine fan type in which means are provided for synchronizing the speeds of the fan rotors as well as the speeds of the basic engines.

I accomplish this and other objects of my invention in one embodiment thereof as applied to a pair of turbofan engines of the free turbine fan type by providing a speed synchronizing arrangement for the gas generator rotors and in combination with this, a separate speed synchronizing loop in which the speds of the fan rotors are automatically adjusted into synchronism with each other. In one embodiment of my invention I adjust the speed of one of the fan rotors, the slave unit, by means of trim tabs on the jet nozzle or discharge nozzle of the fan drive turbine thereby adjusting the pressure distribution through the engine to vary the amount of power delivered to the fan turbine. In another embodiment, I adjust the fan rotor speed of the slave unit by varying the angle of the fan turbine inlet nozzle to change the amount of energy delivered to the fan drive turbine. In each of these systems I use the speeds of the gas generator rotor and fan rotor of one of the engines as reference speeds and provide means for automatically adjusting the speeds of the gas generator rotor and fan rotor of the other engine in response to speed errors between the master and slave engines.

It will be appreciated, of course, that the basic speed range of the fan rotor is determined at any operating point of the speed of the gas generator rotor and that

2 hence the speed adjusting range of the fan synchronizing system can be relatively small, being only that necessary to adjust out speed errors resulting from production tolerances, differences in the installation, and the like. In this respect I also provide means for avoiding excessive adjustment of the energy delivered to the fan of the slave engine in the event of a failure in the master engine causing it to be shut down, an event which produces a large speed error signal calling for the reduction in the energy delivered to the slave engine fan turbine. In one embodiment, I accomplish this by providing a reference generator system which is actuated upon the occurrence of a synchronizign signal of greater than a preselected magnitude which schedules the system to a preselected and preferably optimum operating point in the event of a shutdown of the master engine. The reference generator system is insensitive to signals in the normal speed synchronizing range but is actuated by a signal of a magnitude such as that produced by a shutdown of the master engine.

My invention will be better undertsood and other objects and advantages thereof will become apparent from the following description taken in connection with the accompanying drawings in which:

FIG. 1 is a schematic presentation of a two engine turbofan system having a synchronizing arrangement embodying my invention; and FIG. 2 is a schematic presentation of a portion of the system of FIG. 1 modified to incorporate an alternative embodiment of my invention.

Referring now to FIG. 1, I show a pair of turbofan engines 10 and 11 which are of the type in which the fan rotors are driven by free power turbines. In terms of engine structure, the two engines 10 and 11 are identical and I have therefore presented only a fragmentary view of engine 11 and will describe only the engine 10, although I have identified like components of the engine 11 with the same numerals used on engine 10.

Engine 10 is comprised generally of two major elements, one being a gas generator 12, which includes a compressor 13 driven by a turbine 14 through an interconnecting shaft 15, and the other being a fan portion 16 which comprises a fan drive turbine 17 having a series of fan blades 18 mounted around the outer periphery thereof. In the embodiment shown, the fan blades 18 are integral with the turbine buckets 19 and are separated by means of a shroud 20, but it will be understood that the fan may be made up of a separate disk driven by the free turbine 17. The turbine 17 is supported on a shaft 21 which is mounted in a pair of bearings 22 and 23.

The engine 10 operates in a well known manner with air entering the engine through an inlet 24, passing through the compressor 13, and then flowing through a combustion chamber 25 in which fuel combustion occurs. The hot gases discharged from the combustion chamber 25 impinge on the compressor drive turbine 14 and then pass through a fan turbine nozzle 26 where they are directed against the buckets 19 of the fan drive turbine 17. Upon leaving the fan drive turbine 17, the gases are exhausted from the engine through a discharge nozzle 27.

In order to permit adjustment of the area of the discharge nozzle 27, for a purpose later to be set forth, I provide a series of trim tabs 28 pivotally mounted at 29. The positions of the trim tabs 28 are controlled by a series of actuator motors 30 which are connected to the tabs through connecting rods 31. In operation, the turbine 17 drives the fan 18 to force air flow through the fan duct 32 and through the fan discharge nozzle 33.

In order to synchronize the speeds of the gas generator rotors, I provide tachometer generators 34 and 35 geared respectively to the gas generator rotors of the engines 10 and 11 through bevel gears 36, 37, 38 and 39. The output of the tachometer generator 34 is connected to a frequency discriminator 40 which produces an output signal at 41 proportional to the frequency of the generator output, or in other words a signal proportional to the speed of the gas generator rotor of engine 10. The output of the tachometer generator 35 is connected to a frequency discriminator 42 which produces an output signal at 43 proportional to the speed of the gas generator rotor of the engine 11. The speed proportional signal 41 is subtracted from the speed proportional signal 43 as indicated at the summing block 44 to produce a speed error signal 45, which is then fed to a saturating amplifier 46.

The amplifier error signal which appears at the output of the amplifier at 47 is fed into the main fuel control 48 of the engine 10 to produce an adjustment in fuel flow to the engine 10 in a direction to reduce the speed error signal to zero. In the configuration shown, the gas generator speed of the engine 11 is the reference speed for the system and the fuel flow to this engine is adjusted through a suitable throttle and fuel control system, which is not shown.

The gas generator speed of the engine 10 is adjusted to within synchronizing range by means of a throttle 49 which introduces a throttle input signal 50 to the main fuel control 48 of that engine. Once the gas generator speed of the engine 10 is adjusted to within synchronizing range of the gas generator speed synchronizing system, the system automatically trims the fuel flow to the engine 10 to bring the two gas generator rotors into synchronism.

The speed adjusting range of the gas generator synchronizing system is determined by the signal range of the saturating amplifier 46. The saturating amplifier 46 may be of any well known type which produces an output signal proportional to the magnitude of an input signal up to some preselected signal level, but which then saturates so as to be incapable of producing an output signal of greater than the preselected magnitude regardless of the magnitude of the input signal. Thus, the maximum speed adjustment range of the gas generator rotor synchronizing system is determined by the maximum signal capability of the saturating amplifier 46.

In operation, the gas generator speed of the engine 11 is adjusted individually by means of its own throttle and fuel control system, thus establishing the magnitude of the speed proportional signal 43. The gas generator speed of the engine 10 is then adjusted to within synchronizing range by means of the throttle 49. In this range, the system compares the speed proportional signals 41 and 43 of the gas generator rotors to produce an error signal 45 which in turn adjusts the main fuel control 48 of the engine 10 to synchronize the speed of the gas generator of that engine with the gas generator speed of the engine 11. In the event of a failure in the engine 11 causing a shutdown of that engine and producing a very large error signal at 45, calling for a decrease in fuel flow to the engine 10, the effect is limited by the saturating characteristic of the amplifier 46.

Now, as I have mentioned above, synchronization of the gas generator speeds of the two engines 10 and 11 will not, in the typical case, produce synchronous speeds of the free turbine driven fan rotors even though the engines are of identical design, because of manufacturing tolerances, slight differences in installation configurations and similar variables. I thus provide a separate speed synchronization loop for the fan rotors. Here again, as in the case of the gas generator synchronization system, I use the engine 11 as the master or reference engine although it will be appreciated that since the fan rotor synchronization system is an independent loop, either engine may be selected as the master.

Mounted on the fan rotor shaft 21 of the engine 11 is a tachometer generator 51, the output 52 of which is connected to a frequency discriminator 53 which in turn produces an output signal at 54 proportional to the speed of the fan rotor of the engine 11. The engine 10 is provided with a similar arrangement with a tachometer generator 55 being mounted on its fan rotor shaft and having its output 56 connected to a frequency discriminator 57 which produces a speed proportional signal at 58.

For the configuration shown, the speed signal 58 of the fan rotor of engine 10 is subtracted from the speed signal 54 of the fan rotor of engine 11 to produce a speed error signal at 59. The speed error signal 59 is fed into an amplifier 60, the output 61 of which is connected at 59a to the nozzle trim tab actuators 30 through a set of normally closed relay contacts 62 and a summing block 63. A second output signal 71 of the amplifier 60 is connected to a relay 64 which operates the contact 62 and also operates a second set of contacts 65 which are in the normally open position.

For purposes later to be set forth, I provide a reference generator 66 which produces an output signal at 67 of a preselected fixed magnitude. The reference signal 67 is connected to a summing block 68 along with a position feedback signal 69 from one or more of the actuator motors 30 and the polarity shown. The difference 70 between the reference signal 67 and the position feedback signal 69 is connected into the summing block 63 when the relay 64 operates to close the contacts 65. The operation of the relay 64 simultaneously closes the contacts 65 and opens the contacts 62. The operation of the fan rotor speed synchronization loop will now be explained.

Assuming that the engines 10 and 11 are in operation and that the throttle positions have been adjusted to within synchronizing range and that the gas generator speed synchronizing loop has brought the gas generator rotors into synchronous speed. Assume further that under these conditions, the fan rotor speed of the engine 10 is less than that of the engine 11. The speed proportional signal 54 will therefore be greater than the speed proportional signal 58 such that a positive error signal will be produced at 59. With the relay contacts in the condition illustrated, an amplified speed error signal 59a of a positive polarity will thus be applied to the actuator motors 30 and the motors will begin to turn in a direction to move the trim tabs 28 radially outwardly to increase the area of the jet nozzle 27. This adjustment will produce a change in the pressure ratio distribution through the engine, decreasing the pressure ratio across the nozzle 27 and increasing the pressure ratio across the fan drive turbine 17, thereby increasing the amount of energy delivered to the fan turbine 17. Increasing the energy delivered to the fan drive turbine 17 of the engine 10 will increase the speed of the fan rotor of that engine and this adjustment will continue until the speed proportional signal 58 is equal to the speed proportional signal 54 and the error signal has been reduced to zero, at which point fan rotors will be operating at synchronous speeds.

Similarly, when the speed of the fan rotor of the engine 10 is greater than that of the engine 11, a negative error signal appears at 59 and the actuator motors 30 are driven in the opposite direction to decrease the area of the nozzle 27 and thus decrease the energy delivered to the fan drive turbine 17 of the engine 10 to reduce the fan rotor sped of that engine until the speed proportional signals 54 and 58 are equal and the speed error signal has been eliminated. Thus the system operates to adjust the speed of the fan rotor of the slave engine 10 into synchronism with the speed of the fan rotor of the master engine 11.

Now, it will be observed that in the event of a malfunction causing a shutdown of the master engine 11, a large negative error signal will be generated at 59 calling for a reduction in the speed of the fan rotor of the engine 10. The relay 64 is connected to be actuated by the output signal 71 of the amplifier 60 but is set to operate only upon the occurrence of a signal of greater than a preselected magnitude, the threshold level being chosen such that the relay 64 is not actuated by error signals within the normal operating range but is actuated by an error signal of a magnitude such as that produced by a shutdown of the engine 11. Therefore, under the conditions just described, the relay 64 is actuated to simultaneously close the contacts 65 and open the contacts 62 thereby connecting the signal 70 into the summing block 63 and to the actuator motors 30.

Under these conditions, the output signal 67 of the reference generator 66 determines the position of the nozzle trim tabs 28, this position being preferably selected as the optimum operating point of the engine for nonsynchronous speed operation. The system operates as follows.

If the nozzle trim tabs 28 are in the position specified by the signal 67, then the position feedback signal 69 is equal in magnitude to the signal 67 and the difference or error signal 70 is zero. A position error resulting from a position other than that specified in one direction or the other produces an error signal at 70 of a polarity corresponding to the direction of the error. This error signal 70 is applied to the actuator motors 30 in a direction to correct the error and drive the position signal 69 back to the magnitude specified by the reference generator signal 67.

Thus, for a condition causing a shutdown of the engine 11, the relay 64 is actuated to connect the reference generator into the system and drive the nozzle trim tabs 28 to a preselected and preferably optimum position specified by the reference generator output signal 67. It will be appreciated also that under such conditions means may be provided to permit manual adjustment of the magnitude of the output of the reference generator 66 to permit manual scheduling of the speed of the fan rotor to any desired level.

It will thus be seen that with the arrangement described the engine throttles need only be adjusted to bring the gas generator speeds of the two engines to a point within the synchronizing range, at which point the two speed synchronizing loops automatically operate to synchronize the speeds of the gas generator rotors with each other and also to synchronize the speeds of the two fan rotors. It will be appreciated, of course, that the arrangement shown in FIG. 1 may also be applied to installations having more than two engines, in which case one of the engines is selected as the master or reference engine, and speed synchronizing loops such as those illustrated are provided for each of the other slave engines. In other words, in such an arrangement, each of the slave engines is provided with a system as shown for the engine 10 and each engine receives reference signals 43 and 54 calling respectively for synchronous speeds of each of the gas generator rotors and each of the fan rotors as specified by the corresponding speeds of the master engine. The operation of each of these systems upon shutdown of the master engine is the same as described above.

In FIG. 2, I show an alternative embodiment of my invention in which the fan rotor speeds are synchronized in a different manner. In this embodiment, the speed error signal 59 is generated and amplified in the same manner as illustrated in FIG. 1, and I have labeled the elements leading up to this point with the same numerals as used in FIG. 1. The reference generating system is also the same as that illustrated in FIG. 1, and here again I have used like numerals to designate like elements.

In the embodiment of FIG. 2, however, I use a variable angle turbine nozzle 72 to modulate the power delivered to the fan drive turbine 17 of the engine 10. Such devices are well known in the art and I have illustrated one type in the form of a set of nozzle partitions 73 secured individually on shafts 74 which are rotatably mounted in the turbine casing. Secured to the shaft 74 are links 75 which are pivotally secured by means of pins 76 to an actuating ring 77 which is, in turn, rotated by an actuator motor 78 through an output gear 79, which engages a row of teeth 80 on the ring 77. A position feedback signal 81 is connected from the actuator motor 78 back to the summing block 68 and acts on the system in the same manner as the position feedback signal 69 in the arrangement of FIG. 1.

In normal operation the speed error signal 59 amplified at 59a acts through the actuator motor 78 to adjust the position of the nozzle partitions 73 and thereby vary the power being delivered to the fan drive turbine 17 of the engine 10 to bring the fan rotor speed into synchronism and eliminate the error signal 59. Upon a shutdown of the engine 11 the relay 64 is actuated, opening the contact 62 and closing the contact 65 to connect the reference generator 66 into the system. With the reference generator system operative, the variable turbine nozzle is driven to a position specified by the magnitude of the reference generator output signal 67, a position which is preferably selected as the optimum operating point for the nonsynchronous speed condition.

It will thus be observed that the system of FIG. 2 operates in a manner similar to that of FIG. 1 except that in FIG. 2 the power deliveed to the fan drive turbine is adjusted by varying the angle of the turbine nozzle partitions rather than by adjusting the area of the discharge nozzle. It will also be observed that the system of FIG. 2 can be applied to configurations having more than two engines in which case a system similar to that shown would be provided for each slave engine in the system. It will also be appreciated that the magnitude of the output signal 67 of the reference generator which specifies the position of the variable turbine nozzle in the event of a shutdown of the engine 11, can be controlled manually as was suggested in the case of the configuration shown in FIG. 1.

I have thus provided a turbofan engine speed synchronizing system applicable in particular to engines having free turbine driven fan rotors, in which separate loops are provided for synchronizing the gas generator rotors and for synchronizing the fan rotors. It will be appreciated, of course, that my invention may take other forms than the particular ones selected herein for presentation purposes. For example, the reference generator system shown in FIGS. 1 and 2 which schedules a preselected operating condition for the fan portion of the engine in event of a failure of the master engine may be replaced by a saturating amplifier arrangement similar to that illustrated in FIG. 1 in connection with the gas generator rotor speed synchronization system. In such a system the maximum fan speed trim capability of the system would be limited by the saturating characteristic and in the event of a failure in the master engine 11 the fan speed trim system of the engine 10 would merely move to a position corresponding to the maximum signal capability of the system as determined by the saturating level of the amplifier.

It will thus be apparent that various changes, modifications, and substitutions may be made in the embodiments presented herein without departing from the true scope and spirit of my invention as I have defined it in the appended claims.

What I claim as new and desire to secure by Letters Patent of the United States is:

1. In a turbofan engine installation having at least first and second turbofan engines each of the type having a gas generator rotor and a separately mounted fan rotor driven by a free power turbine, a combination speed synchronizing system for the gas generator rotors and the separately mounted fan rotors, respectively, comprising:

(a) tachometer generator means for generating a first speed dependent signal as a function of the fan rotor sped of said first engine, (b) tachometer generator means for generating a second speed dependent signal as a function of the fan rotor speed of said second engine, (c) tachometer generator means for generating a third speed dependent signal as a function of the speed of the gas generator rotor of said first engine, (d) tachometer generator means for generating a fourth speed dependennt signal as a function of the speed of the gas generator rotor of said second engine, (e) frequency discriminator and signal summing means for deriving a first speed error signal proportional to the difference between said first and second speed dependent signals, (f) means for varying the area of the discharge nozzle associated with the free power turbine of said first engine responsive to said first speed error signal for adjusting the power output of the free power turbine of said first engine to synchronize the speeds of said first and second engine fan rotors (g) frequency discriminator and signal summing means for deriving a second speed error signal proportional to the difference between said third and fourth speed dependent signals, (h) fuel control means associated with at least one of said engines and responsive to said second speed error signal to modulate the fuel flow rate to said one engine to synchronize the speeds of said first and second gas generator rotors, and (i) control means operable in responsive to a shutdown of said second engine to adjust said power modulating means to a preselected condition, said control means including a reference generator which produces an output signal scheduling said power modulating means to a preselected condition determined by said output signal.

2. In a turbofan engine installation having at least first and second turbofan engines each of the type having a gas generator rotor and a separately mounted fan rotor driven by a free power turbine, a combination speed synchronizing system for the gas generator rotors and the separately mounted fan rotors, respectively, comprising:

(a) tachometer generator means for generating a first speed dependent signal as a function of the fan rotor speed of said first engine, (b) tachometer generator means for generating a second speed dependent signal as a function of the fan rotor speed of said second engine, (c) tachometer generator means for generating a third speed dependent signal as a function of the speed of the gas generator rotor of said first engine, (d) tachometer generator means for generating a fourth speed dependent signal as a function of the speed of the gas generator rotor of said second engine, (e) frequency discriminator and signal summing means for deriving a first speed error signal proportional to the difference between said first and second speed dependent signals, (f) variable angle inlet nozzle means located immediately upstream of the free power turbine of said first engine including actuating means responsive to said first speed error signal and connected to actuate said variable angle nozzle for adjusting the power output of the free power turbine of said first engine to synchronize the speeds of said first and second engine fan rotors, (g) frequency discriminator and signal summing means for deriving a second speed error signal proportional to the difference between said third and fourth speed dependent signals, (h) fuel control means associated with at least one of said engines and responsive to said second speed error signal to modulate the fuel flow rate to said one engine to synchronize the speeds of said first and second gas generator rotors, and (i) control means operable in response to a shutdown of said second engine to adjust said power modulating means to a preselected condition, said control means including a reference generator which produces an output signal scheduling said power modulating means to a preselected condition determined by said output signal.

References Cited by the Examiner

UNITED STATES PATENTS

| | | | |
|---|---|---|---|
| 2,625,789 | 1/53 | Starkey | 60—39.16 |
| 2,696,268 | 12/54 | Marchant | 170—135.29 |
| 2,734,340 | 2/56 | Wood | 60—39.28 |
| 2,782,601 | 2/57 | Hamilton | 60—97 |
| 2,782,602 | 2/57 | Hamilton | 60—97 |
| 2,977,756 | 4/61 | Stone | 60—39.28 |
| 2,989,843 | 6/61 | Ferri | 60—35.6 |
| 3,021,668 | 2/62 | Longstreet | 60—35.6 |

SAMUEL LEVINE, *Primary Examiner.*

JULIUS E. WEST, *Examiner.*